United States Patent
Marsella et al.

(10) Patent No.: US 9,432,128 B2
(45) Date of Patent: Aug. 30, 2016

(54) RECEIVER FOR OPTICAL TRANSMISSION SYSTEM

(75) Inventors: Domenico Marsella, Pisa (IT); Marco Secondini, Rome (IT); Roberto Magri, Parma (IT); Enrico Forestieri, Parma (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/408,282

(22) PCT Filed: Jul. 25, 2012

(86) PCT No.: PCT/EP2012/064596
§ 371 (c)(1),
(2), (4) Date: Feb. 26, 2015

(87) PCT Pub. No.: WO2013/185850
PCT Pub. Date: Dec. 19, 2013

(65) Prior Publication Data
US 2015/0180588 A1      Jun. 25, 2015

(30) Foreign Application Priority Data

Jun. 15, 2012  (EP) .................................... 12172268

(51) Int. Cl.
*H04B 10/61* (2013.01)
*H04B 10/63* (2013.01)
*H04B 10/69* (2013.01)

(52) U.S. Cl.
CPC ........ *H04B 10/6971* (2013.01); *H04B 10/616* (2013.01); *H04B 10/695* (2013.01)

(58) Field of Classification Search
CPC .......... H04B 10/6166; H04B 10/6163; H04B 10/616; H04B 10/695; H04B 10/6971
USPC ........................................ 398/208, 209, 210
See application file for complete search history.

(56) References Cited

U.S. PATENT DOCUMENTS

| | | | |
|---|---|---|---|
| 7,606,498 B1 | 10/2009 | Wu et al. | |
| 8,023,834 B2 * | 9/2011 | Koc | H04B 10/61 398/202 |
| 2012/0008952 A1 * | 1/2012 | Li | H04B 10/50 398/65 |
| 2012/0134685 A1 * | 5/2012 | Ohtomo | H04B 10/611 398/208 |
| 2012/0213532 A1 * | 8/2012 | Hironishi | H04B 10/6165 398/208 |

FOREIGN PATENT DOCUMENTS

| WO | WO-2010/094339 A1 | 8/2010 |
|---|---|---|
| WO | WO-2011/083575 A1 | 7/2011 |

OTHER PUBLICATIONS

PCT International Search Report, Application No. PCT/EP2012/064596, dated Mar. 20, 2013; 4pgs.

(Continued)

*Primary Examiner* — Dalzid Singh
(74) *Attorney, Agent, or Firm* — NDWE LLP (57) ABSTRACT

A method of detecting a signal in an optical receiver is described. The method includes converting a received optical signal to a digital electrical signal comprising a plurality of samples, applying a predetermined phase rotation to said samples to obtain amplitude and phase components of phase range adjusted sample values, and performing a first detection process based on the amplitude and phase components of the phase range adjusted sample values.

27 Claims, 6 Drawing Sheets

(56) References Cited

OTHER PUBLICATIONS

Ip, Ezra and Kahn, Joseph, 'Compensation of Dispersion and Nonlinear Impairments Using Digital Backpropagation,' Journal of Lightwave Technology, vol. 26, No. 20; IEEE Service Center, New York, NY; copyright IEEE 2008; ISSN: 0733-8724; Oct. 15, 2008; 10pgs.

G. David Forney, Jr., 'The Viterbi Algorithm,' Proceedings of the IEEE, vol. 61, No. 3, Mar. 1973; 11pgs.

Essiambre, Rene-Jean et al., 'Capacity Limits of Optical Fiber Networks,' Journal of Lightwave Technology, vol. 28, No. 4, ISSN: 0733-8724; IEEE Xplore; copyright IEEE 2010; Feb. 15, 2010; 40pgs.

Secondini, Marco et al., 'A Combined Regular-Logarithmic Perturbation Method for Signal-Noise Interaction in Amplified Optical Systems,' Journal of Lightwave Technology, vol. 27, No. 16; ISSN: 0733-8724; copyright IEEE 2009; Aug. 15, 2009; 12pgs.

International Preliminary Report on Patentability, Application No. PCT/EP2012/064596, dated Dec. 24, 2014, 8 pages.

* cited by examiner

RECEIVER FOR OPTICAL TRANSMISSION SYSTEM

CROSS-REFERENCE TO RELATED APPLICATIONS

This application is a National stage of International Application No. PCT/EP2012/064596, filed Jul. 25, 2012, which claims priority to EP Application No. 12172268.0, filed Jun. 15, 2012, which are hereby incorporated by reference.

TECHNICAL FIELD

This invention relates to a receiver for an optical transmission system, and in particular to a receiver that is able to mitigate the effects of non linear distortion in the transmission medium, which might for example be a fibre, and to a method of signal detection in such a receiver.

BACKGROUND

Optical transmission systems, in particular optical fibre transmission systems, are widely used for sending signals over long distances. That is, electrical signals representing data are converted into optical signals, which are transmitted over the transmission medium (such as the optical fibre) to a receiver, where they are converted back to electrical signals. Signal detection processes are then performed in the receiver, in order to recreate as far as possible the data content of the original electrical signals. In order to achieve this recreation of the original data content, various signal detection techniques can be used, in order to compensate for the effects of distortion that occur in the transmission medium (such as the optical fibre).

It is known that linear distortion can be compensated to a large extent by adaptive linear equalizers, but there are also non-linear distortions, and it is more difficult to mitigate the effects of these. The document "Compensation of dispersion and nonlinear impairments using digital backpropagation", E. Ip and J. Kahn, J. Lightwave Technol. 26,3416-3425 (2008), describes a technique whereby the received digitized signal is back-propagated toward the transmission end by solving, in the digital domain, the Non Linear Schrodinger equation that describes propagation in the optical fibre. This technique is computationally very demanding, and has not provided wholly satisfactory results.

SUMMARY

According to the present invention, there is provided a method of detecting a signal in an optical receiver. According to the method, a received optical signal is converted to a digital electrical signal comprising a plurality of samples. A predetermined phase rotation is applied to said samples to obtain amplitude and phase components of phase range adjusted sample values. A first detection process is then performed based on the amplitude and phase components of the phase range adjusted sample values.

This has the advantage that, because some non-linearly distorted signals can be modelled with acceptable accuracy by Gaussian distributed correlated amplitude and phase components, the first detection process can produce accurate detection results.

In some embodiments, the received optical signal is converted to a digital electrical signal by converting the received optical signal to a digital electrical signal having in-phase and quadrature components, and the in-phase and quadrature components are converted to amplitude and phase components before performing the first detection process.

In some embodiments, said predetermined phase rotation is applied to said samples before converting said in-phase and quadrature components to amplitude and phase components. An inverse of said predetermined phase rotation is then applied to said phase components such that the phase range adjusted sample values have phases within ranges suitable for said conversion.

This has the advantage that the conversion of the in-phase and quadrature components to amplitude and phase components then produces results that can be manipulated as required.

The predetermined phase rotation can be determined in a training process, and retrieved from a look up table, based on a phase of the respective sample.

In some embodiments, the first detection process is a Maximum Sequence Likelihood Estimation process, for example using a Viterbi algorithm.

In some embodiments, a second detection process is performed, based on said in-phase and quadrature components of the digital electrical signal. A detector output is then selected from outputs of the first and second detection processes, for example based on respective quality measurements of outputs of the first and second detection processes.

In some embodiments, the second detection process is a Maximum Sequence Likelihood Estimation process, for example using a Viterbi algorithm.

The optical receiver may be an optical fibre receiver.

According to other aspects of the invention, there are provided: a detector, for detecting a signal in an optical receiver, the detector comprising a processor adapted to operate in accordance with a method according to the first aspect; an optical receiver, comprising an optical front end and such a detector (80); and a computer readable medium, comprising computer readable code for performing the method according to the first aspect.

BRIEF DESCRIPTION OF THE DRAWINGS

FIGS. 6(*a*) and 6(*b*) illustrate two forms of equalizer for use in the receiver of FIG. 2.
FIGS. 9(*a*) and 9(*b*) illustrate two further forms of equalizer for use in the receiver of FIG. 2.
FIGS. 10(*a*) and 10(*b*) are results of simulations using different receivers.

DETAILED DESCRIPTION

Figure 1:
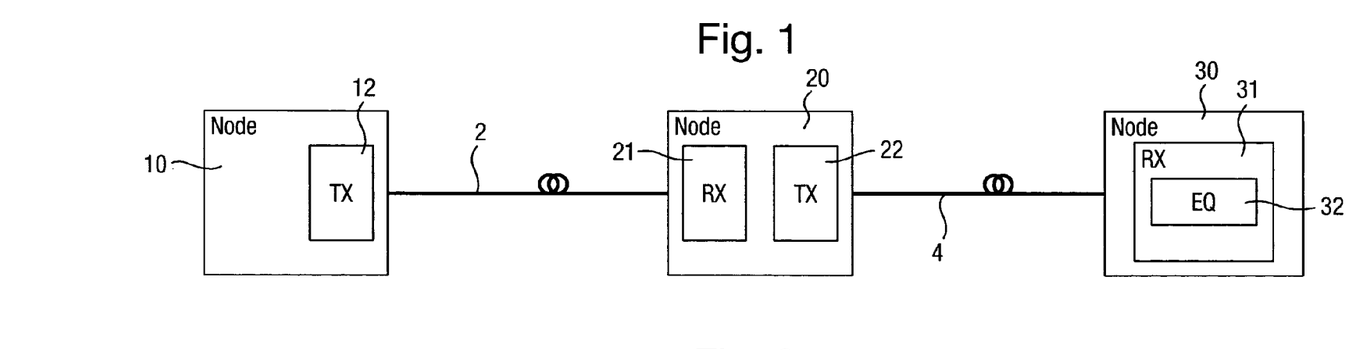
FIG. 1 shows an optical transmission system.

FIG. 1 is a schematic illustration of a part of an optical transmission system. In this embodiment, the optical transmission system is a fibre optic transmission system. FIG. 1 shows three network nodes 10, 20, 30, connected by optical fibre links 2, 4. A first node 10 includes a transmitter 12. A second node 20 has a receiver 21 and a transmitter 22. A third node 30 has a receiver 31, which includes an equalizer 32. It will be appreciated that an optical transmission system will be more complex than this, but FIG. 1 shows only those elements of the system that are essential for an understanding of the present invention.

In use, an electrical signal representing data is converted into optical signals in the transmitter 22, and the optical signals are transmitted over the optical fibre 4 to the receiver 31, where they are converted back to electrical signals. Signal detection processes are then performed in the receiver, in order to recreate as far as possible the data content of the original electrical signals.

Figure 2:
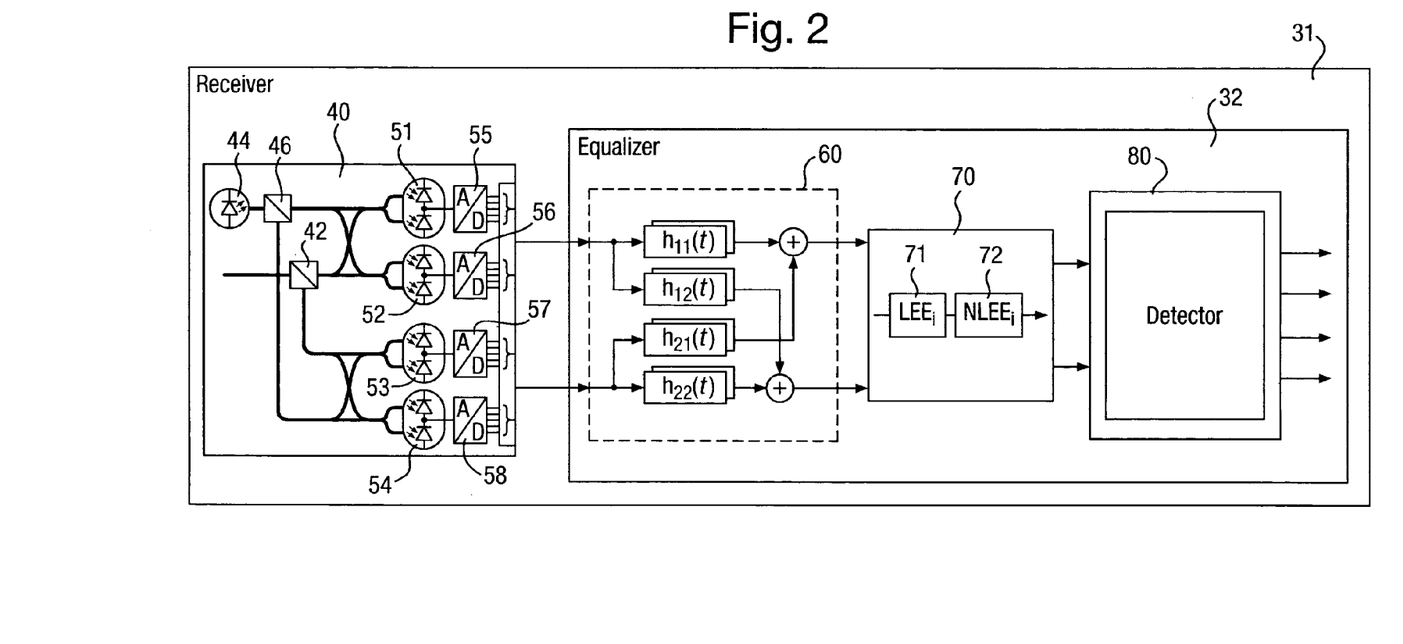
FIG. 2 shows a receiver for use in a node of the optical transmission system of FIG. 1.

FIG. 2 shows in more detail the form of the receiver 31. The receiver 31 includes a coherent optical front end block 40. In this embodiment, the block 40 is configured to produce Cartesian components of the received signal in two polarizations. Thus, a received optical signal is applied to a polarization splitter 42, which splits the received signal into the two polarization components. An output of a local laser 44 is applied to a second polarization splitter 46, and is mixed with the polarization components of the incoming signal. The four resulting mixed optical output signals are applied to four pairs of photodetectors 51, 52, 53, 54. The photodetectors 51, 52, 53, 54 generate analog electrical signals, which are applied to respective analog-digital converters 55, 56, 57, 58, which generate digital electrical signals.

The digital electrical signals are applied to the equalizer 32, which can advantageously take the form of a Digital Signal Processor (DSP). The DSP will typically take the form of a single integrated circuit, provided with suitable instructions for performing the functions of one or more of the embodiments described herein.

In this illustrated embodiment, the equalizer 32 includes a linear equalizer 60, which can take the form of a conventional equalizer, for example including a Finite Impulse Response (FIR) filter and/or an Infinite Impulse Response (IIR) filter, although it will be understood that this can be omitted if the only concern is to mitigate the effects of non-linear distortion.

In this illustrated embodiment, the equalizer 32 also includes a backpropagation block 70, which can include at least one cascade of a linear equalization element (LEE) 71 and a non-linear equalization element (NLEE) 72, as described in the document WO2010/094339. Again, it will be understood that the backpropagation block 70 can be omitted if the effects of non-linear distortion can be sufficiently mitigated without it.

The equalizer 32 also includes a detector 80. The inventors have surprisingly discovered and subsequently recognised that, in certain circumstances, particularly in the case of compensated optical fibre links such as those using non-zero dispersion fibre (NZDF), the non-linearly distorted signals can be modelled with acceptable accuracy by Gaussian distributed correlated amplitude and phase components (that is, they are approximately Gaussian in polar coordinates), while they show Gaussian In-phase and Quadrature (I/Q) components (that is Gaussian in Cartesian coordinates) in uncompensated links or in links with high dispersive fiber such as single mode fibre (SMF).

Figure 3:
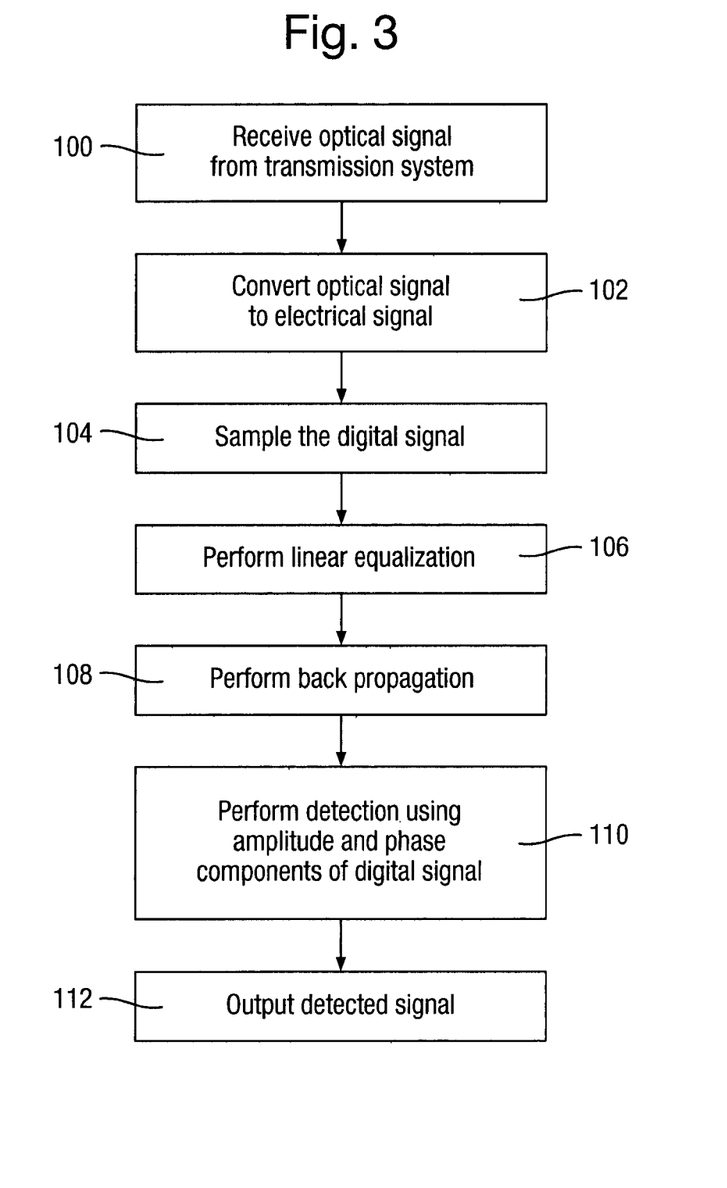
FIG. 3 shows a method of signal processing in a receiver.

FIG. 3 is a flow chart, illustrating a method of receiving signals, in the receiver 31. Thus, in step 100, the optical signal is received at the front-end 40. In step 102, the optical signal is converted to an electrical signal in the photodetectors 51, 52, 53, 54. In step 104, the electrical signals are sampled, and converted to digital signals.

In step 106, a linear equalization may be performed by the linear equalizer 60. In step 108, back propagation may be performed by the backpropagation block 70.

In step 110, a detection process is performed. As mentioned above, the described embodiment proceeds from the recognition that the non-linearly distorted signals have Gaussian distributed correlated amplitude and phase components, and so the detection is performed using the amplitude and phase components, as described in more detail below. In step 112, the detected signals are output.

Figure 4:
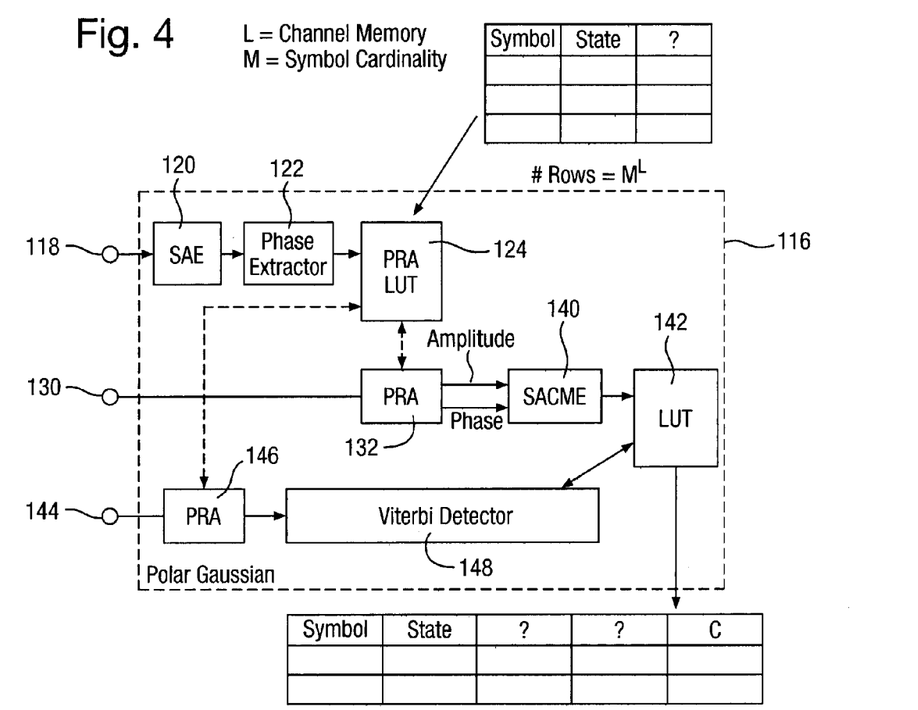
FIG. 4 illustrates a first detector for use in the receiver of FIG. 2.

FIG. 4 shows the form of the detector 80, where it takes the form of a polar Gaussian detector block 116, specifically a maximum sequence likelihood detector (MLSD) operating only on polar metrics for a single polarization.

In this case, it is assumed that the front-end 40 generates samples in Cartesian form, that is, it generates in-phase and quadrature components of each sample. Thus, in order to act on the polar components, the Cartesian components need to be converted to polar form.

However a simple evaluation of the phase leads to incorrect signal estimates. The inventors have appreciated that this problem arises from the limited range for the phase extraction function (e.g. $-\pi$ to $\pi$ in one common implementation of the phase extraction function using the arctan relationship between the Cartesian components). Specifically, samples that have very similar phases can appear to be at the two extreme ends of this range, with the result that taking the average phase will give an incorrect result.

To obtain the correct Gaussian parameters the phase of the samples needs to be continuously monitored and centered. As described in more detail below, this is achieved by rotating incoming samples by a specific phase value, which is computed during a training phase and stored in a look-up table.

Thus, during a first training phase, Cartesian samples representing a suitable sequence of training symbols are passed to a first input 118 of the detector. The received samples are passed to a sequence average estimation (SAE) block 120, which determines the average of the samples of the training sequence. Then, a phase extractor 122 computes the phase for the averaged value and the obtained phases are stored in a phase range adaptor look up table (PRA LUT) 124. As shown in FIG. 4, the PRA LUT 124 has $M^L$ rows, where L is the channel memory, and M is the symbol cardinality, with each row containing the calculated phase value for each combination of symbol identifier and state identifier of a received sample.

After the first training phase is complete, Cartesian samples representing a second training sequence are passed to a second input 130 of the detector. The received samples are then passed to a phase range adapter (PRA) block 132, which adjusts the phase of the received samples.

Figure 5:
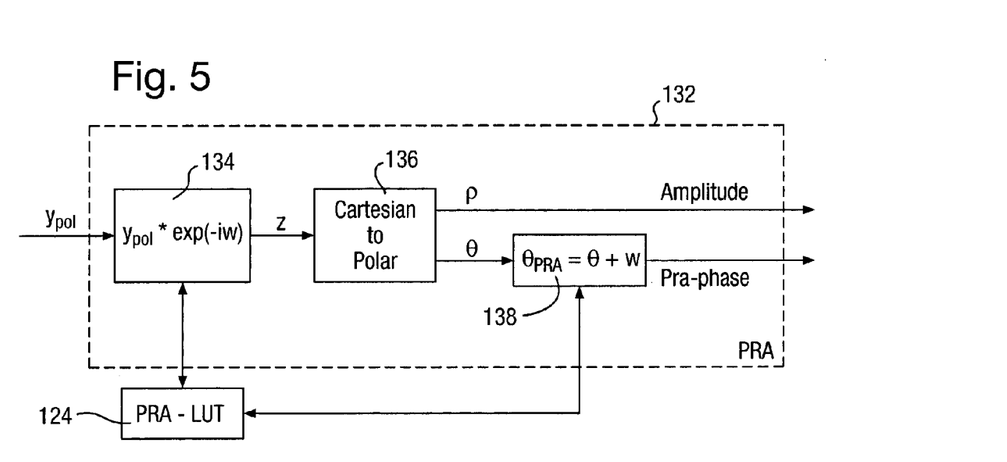
FIG. 5 illustrates in more detail a block of the receiver in the detector of FIG. 4.

FIG. 5 shows in more detail the form of the PRA block 132. Specifically, a received sample value $y_{pol}$ in Cartesian form is passed to a rotator 134. The transmitted symbol is known, as it is part of the training sequence, and so this allows the appropriate row in the PRA-LUT 124 to be accessed, and the stored phase value ω is retrieved.

The rotator then rotates the sample value $y_{pol}$ by the inverse of the stored phase value ω, by multiplying $y_{pol}$ by $e^{-i\omega}$ to obtain a rotated sample value z. The rotated sample value z is then passed to a Cartesian-to-polar converter block 136, which obtains polar components, namely the amplitude ρ and phase θ, in a conventional manner from the Cartesian components. The phase θ therefore lies in the range used by the phase extraction function (e.g. $[-\pi, \pi]$).

The calculated phase θ of the rotated sample value z is then passed to a correction block 138, where the stored phase value ω is added to the calculated phase θ to obtain a phase range adapted phase value $\theta_{PRA}=\theta+\omega$. This effectively applies a derotation that is equal and opposite to that applied by the rotator 134, and so the phase range adapted phase value $\theta_{PRA}$ is equal to the phase of the sample value $y_{pol}$, but is established in the adapted range $[(-\pi+\omega), (\pi+\omega)]$. Thus, this phase range adapted phase value is in a new range, allowing the average phase value of the samples to be taken accurately.

The amplitude ρ and the phase range adapted phase value $\theta_{PRA}$ are then passed to a Signal Average and Covariance Estimator block (SACME) 140, which operates as in a conventional Viterbi decoder to populate a second look-up table 142. As shown in FIG. 4, this look-up table 142 has a row for each symbol and state combination, and stores values of the signal amplitude average, the phase average and the covariance matrix values for each combination.

After the training has been completed, the detection step is performed by passing incoming samples to a third input 144 of the detector. The received samples are then passed to a phase range adapter (PRA) block 146, which operates in exactly the same manner as the phase range adapter (PRA) block 132 shown in FIG. 4, and thus adjusts the phase of the received samples, based on the content of the PRA-LUT 124. The effect of this phase rotation is that the phase range of the symbols can be centered, and so the average phase of the symbols can be calculated correctly.

The received samples, in phase adjusted polar form, are then passed to a Viterbi decoder 148. Thus, in this case, the Viterbi algorithm operates with metrics based on the polar coordinates. The detector 148 then generates output values that can be passed to a further block of the receiver.

In addition, the LUT 142 can be updated during this detection step, assuming the decisions on the symbols are correct.

Although this embodiment is illustrated with reference to the case where the detector uses a Viterbi decoder block 148, any suitable detection strategy can be used. In particular any Maximum Likelihood Sequence Detection algorithm can be used. The Viterbi decoder block 148 can be replaced by an equalizer.

Embodiments have been described so far with reference to a receiver that is suitable for use in a transmission system in which the signals are transmitted with a single polarization. However, the same principle can be used in a transmission system using polarization multiplexed transmission, in which case signals are transmitted with two (or more) polarizations.

Figure 6A:
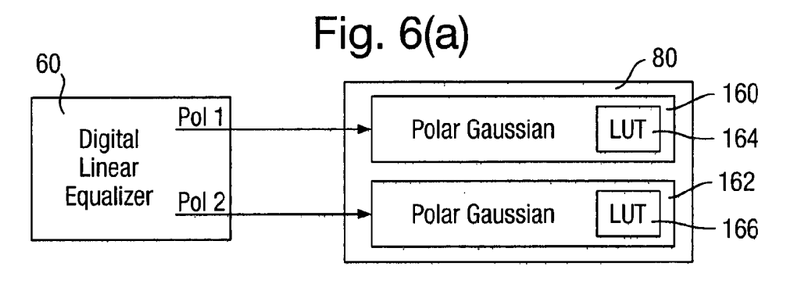
Figure 6B:
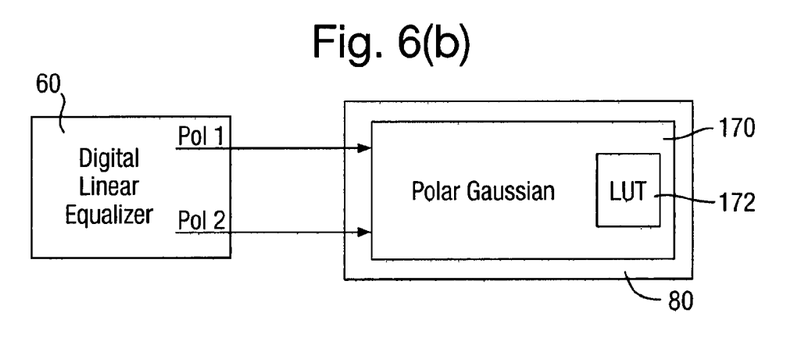

FIG. 6 shows two possible forms of the equalizer 32 that can be used in the case of polarization multiplexed transmissions. In FIG. 6, the equalizer 32 includes a digital linear equalizer 60 and a detector 80. As in FIG. 2, a backpropagation block 70 can be included if required.

FIG. 6(*a*) shows an equalizer 32 in which the digital linear equalizer 60 generates two parallel streams of samples (Pol 1 and Pol 2), representing the samples sent with the two polarizations, with these streams being processed independently. That is, the detector 80 includes two polar Gaussian detector blocks 160, 162, each having the same general form as the polar Gaussian detector block 116 shown in FIG. 4, and each having a respective second look-up table 164, 166.

FIG. 6(*b*) shows an alternative equalizer 32 in which the digital linear equalizer 60 again generates two parallel streams of samples (Pol 1 and Pol 2), representing the samples sent with the two polarizations, and these streams are processed jointly. That is, the detector 80 includes one polar Gaussian detector block 170, having the same general form as the polar Gaussian detector block 116 shown in FIG. 4, but operating with joint metrics, and having a single second look-up table 172.

As described previously, the polar Gaussian detection scheme works best in compensated links with low dispersion fiber. However, there remain network scenarios in which detection based on Cartesian Gaussian coordinates produces better results.

Figure 7:
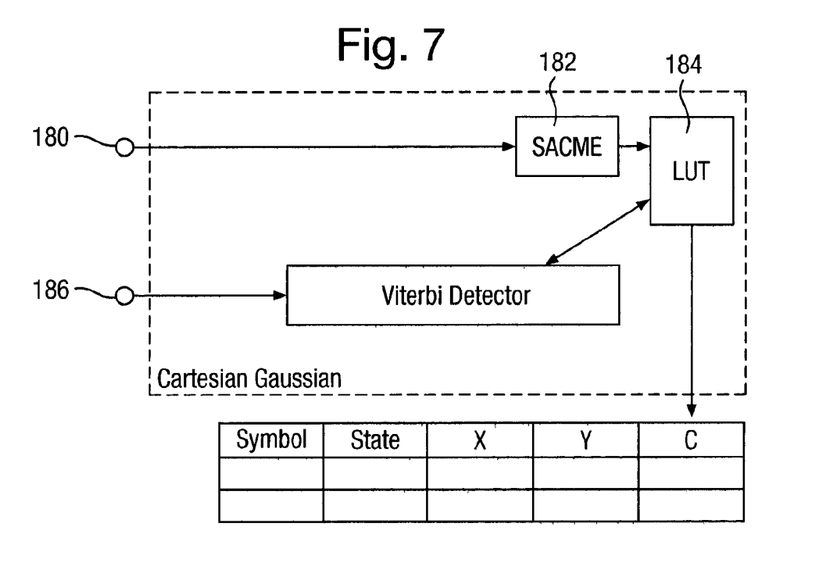
FIG. 7 illustrates an alternative detector.

FIG. 7 therefore illustrates a detector suitable for operating on Cartesian Gaussian components of samples.

During a first training phase, Cartesian samples representing a suitable sequence of training symbols are passed to a first input 180 of the detector. The Cartesian components are then passed to a Signal Average and Covariance Estimator block (SACME) 182, which operates as in a conventional Viterbi decoder to populate a look-up table 184. As shown in FIG. 7, this look-up table 184 has a row for each symbol and state combination, and stores values of the signal average in-phase component, the average quadrature component and the covariance for each combination.

After the training has been completed, the detection step is performed by passing incoming samples to a second input 186 of the detector. The received samples are then passed to a Viterbi decoder 188. The detector 188 then generates output values that can be passed to a further block of the receiver. It is noted that the Cartesian Gaussian metrics also accounts for correlation between the terms and is different from a scheme based on complex signal processing, using Euclidean Distance metrics.

Again, although this embodiment is illustrated with reference to the case where the detector uses a Viterbi decoder block 188, any suitable detection strategy can be used. In particular any Maximum Likelihood Sequence Detection algorithm can be used. The Viterbi decoder block 188 can be replaced by an equalizer.

Figure 8:
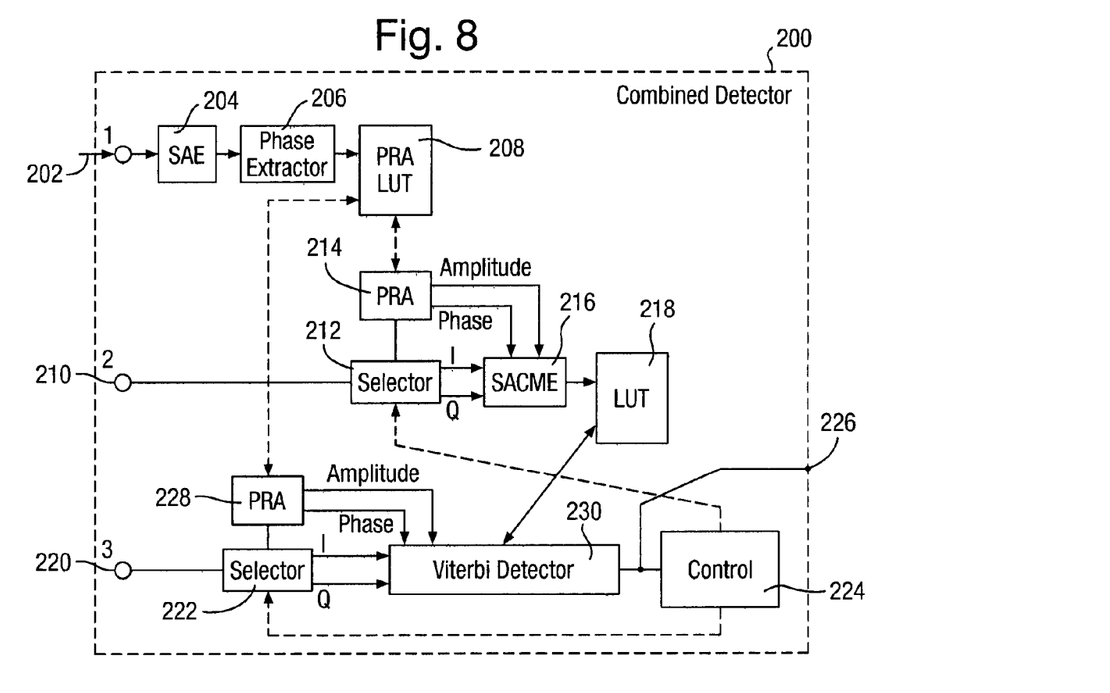
FIG. 8 illustrates a second detector for use in the receiver of FIG. 2.

FIG. 8 shows a combined detector 200, that can use both Cartesian and Polar strategies, selecting the best one based on performance measurements.

Thus, during a first training phase of the detector 200, Cartesian samples representing a suitable sequence of training symbols are passed to a first input 202 of the detector. The received samples are passed to a sequence average estimation (SAE) block 204, which determines the average of the samples of the training sequence). Then, a phase extractor 206 computes the phase for the averaged value and the obtained phases are stored in a phase range adaptor look up table (PRA LUT) 208, as described with reference to FIG. 4.

After the first training phase is complete, Cartesian samples of a second training sequence are passed to a second input 210 of the detector. The received samples are then passed to a selector 212. The selector 212 can be controlled so that the detector 200 is trained in both Cartesian and Polar strategies.

When the selector 212 is set such that training in the polar strategy is being performed, the received samples are passed to a phase range adapter (PRA) block 214, which operates in the same way as the PRA block 132 shown in FIG. 5, in that it adjusts the phase of the received samples, and generates an amplitude value and a phase range adapted phase value, which are then passed to a Signal Average and Covariance Estimator block (SACME) 216, which operates as in a conventional Viterbi decoder to populate a second look-up table 218.

When the selector 212 is set such that training in the Cartesian strategy is being performed, the Cartesian components of the received samples are passed direct to the Signal Average and Covariance Estimator block (SACME) 216, which operates as in a conventional Viterbi decoder to populate the look-up table 218.

After the training has been completed, the detection step is performed by passing incoming samples to a third input 220 of the detector. The received samples are then passed to a second selector 222.

The second selector 222 is controlled by a control block 224, which determines whether the detector should operate using the Cartesian or Polar strategy. In this illustrated embodiment, the output signal of the detector at the output point 226 is also passed to the control block 224, which determines a quality measurement of the output signal. For example, the control block 224 can determine whether the bit error rate (BER) of the output signal is above or below a certain threshold value, and can switch to select the other strategy if the BER of the output signal is above the threshold value. As another example, the control block 224 can control the second selector 222 to switch between the Cartesian and Polar strategies, and can then control the second selector 222 to select the strategy that produces the lower BER. The control block 224 can also allow external control, so that a user and/or an external controller can determine whether the detector should operate using the Cartesian or Polar strategy.

When the second selector 222 is set such that the polar detection strategy is being performed, the received samples are passed to a phase range adapter (PRA) block 228, which operates in exactly the same manner as the phase range adapter (PRA) block 132 shown in FIG. 4, and thus adjusts the phase of the received samples, based on the content of the PRA-LUT 208.

The received samples, in phase adjusted polar form, are then passed to a Viterbi decoder 230. Thus, in this case, the Viterbi algorithm operates with metrics based on the polar coordinates. The detector 230 then generates output values that can be passed to the output 226, and then to a further block of the receiver.

In addition, the second LUT 218 can be updated during this detection step, assuming the decisions on the symbols are correct.

When the second selector 222 is set such that the Cartesian detection strategy is being performed, the detection step is performed by passing incoming samples to the Viterbi decoder 230. The detector 230 then generates output values that can be passed to the output 226, and then to a further block of the receiver. As before, the Cartesian Gaussian metrics also accounts for correlation between the terms and is different from a scheme based on complex signal processing, using Euclidean Distance metrics.

Again, although this embodiment is illustrated with reference to the case where the detector uses a Viterbi decoder block 230, any suitable detection strategy can be used. In particular any Maximum Likelihood Sequence Detection algorithm can be used. The Viterbi decoder block 230 can be replaced by an equalizer.

Thus, the detector can select between the two strategies, based on BER feedback, or based on a preset value. This provides additional flexibility, when required by the network scenario to be addressed.

Embodiments have been described so far with reference to a combined detector receiver that is suitable for use in a transmission system in which the signals are transmitted with a single polarization. However, the same principle can be used in a transmission system using polarization multiplexed transmission, in which case signals are transmitted with two (or more) polarizations.

Figure 9A:
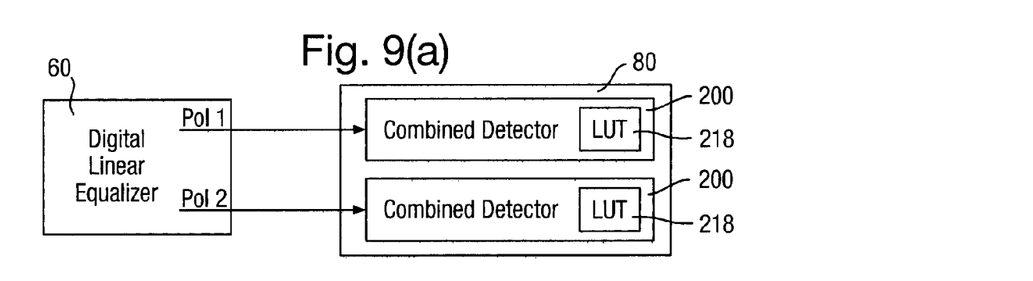
Figure 9B:
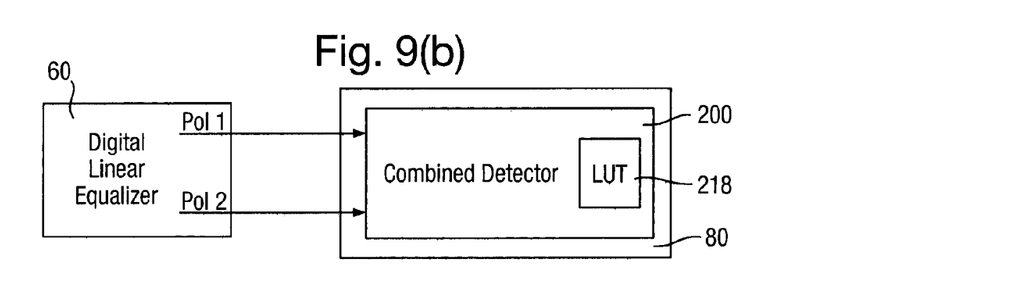

FIG. 9 shows two possible forms of the equalizer 32 that can be used in the case of polarization multiplexed transmissions. In FIG. 9, the equalizer 32 includes a digital linear equalizer 60 and a detector 80. As in FIG. 2, a backpropagation block 70 can be included if required.

FIG. 9($a$) shows an equalizer 32 in which the digital linear equalizer 60 generates two parallel streams of samples (Pol 1 and Pol 2), representing the samples sent with the two polarizations, with these streams being processed independently. That is, the detector 80 includes two combined detector blocks 200, each having the same general form as the combined detector 200 shown in FIG. 8, and each having a respective second look-up table 218.

FIG. 9($b$) shows an alternative equalizer 32 in which the digital linear equalizer 60 again generates two parallel streams of samples (Pol 1 and Pol 2), representing the samples sent with the two polarizations, and these streams are processed jointly. That is, the detector 80 includes one combined detector block 200, having the same general form as the combined detector block 200 shown in FIG. 8, but operating with joint metrics, and having a single second look-up table 218.

Figure 10A:
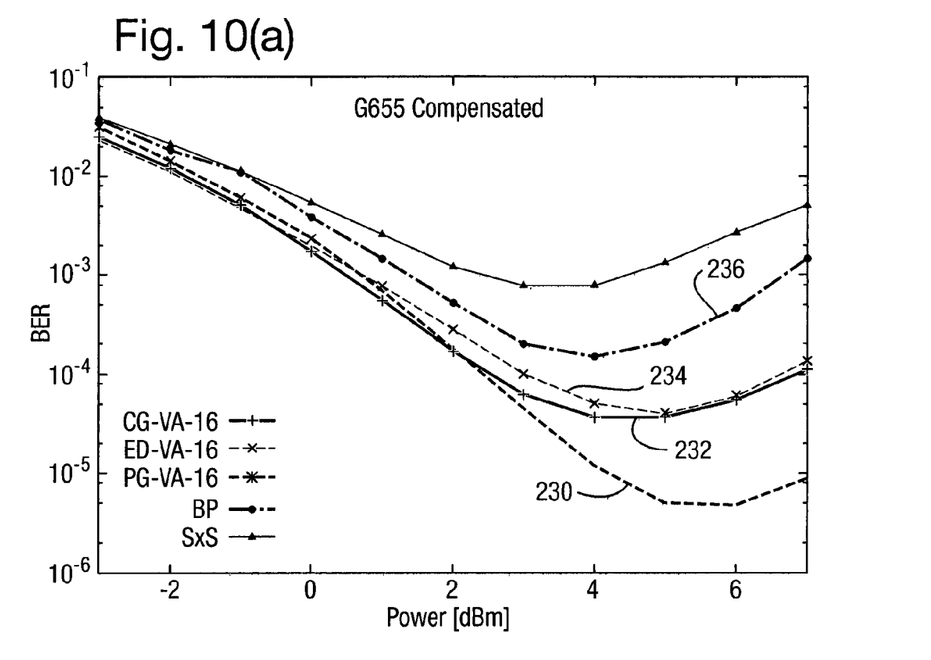
Figure 10B:
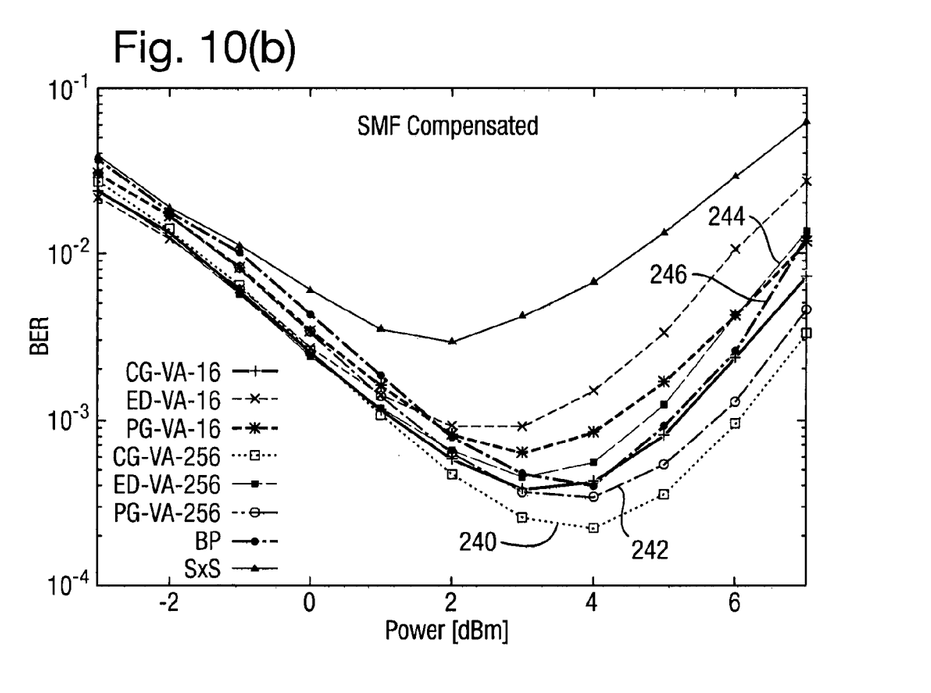

FIG. 10 illustrates the results of using the method described herein, based on a simulation considering single channel transmission and single polarization. A 50 Gb/s NRZ-DQPSK transmitted signal was generated by a nested Mach-Zehnder modulator with 20 GHz bandwidth and filtered by a 4th-order Gaussian bandpass filter with 45 GHz bandwidth. The received signal was filtered by a 4th-order Gaussian bandpass filter with 40 GHz bandwidth and processed according to different strategies, with 2 samples per symbol. The Viterbi Algorithm (VA) with ED (Euclidean Distance), CG (Cartesian Gaussian), or PG (Polar Gaussian) metrics is implemented with 16 states (nonlinear ISI limited to 2 symbols). For each state and symbol, the required conditional expectation and covariance matrix (for CG and PG only) are estimated and stored in a look-up table by using a suitable training sequence and assuming that samples spaced more than 1=R are uncorrelated. FIG. 10 compares the performances of these detection methods, in terms of bit error rate (BER) versus launch power, for a 10×130 km link of fiber.

FIG. 10($a$) shows the results when using G655 non-zero dispersion fibre (NZDF), the nonlinear inter-symbol interference (ISI) induced by dispersion and nonlinearity is limited to a few symbols and can be handled by the 16-state VA. It can be seen that the polar Gaussian (PG) metric better accounts for nonlinear phase noise and therefore produces better results (indicated by the line 230) than those produced by the Cartesian Gaussian (CG) metric (indicated by the line 232) and the Euclidean distance metric (indicated by the line 234) and outperforms the backpropagation (BP) algorithm (indicated by the line 236).

FIG. 10($b$) shows the results when using G652 single mode fibre (SMF), where dispersion is higher, and nonlinear ISI depends on a high number of symbols and dominates the performance. In this case, FIG. 10($b$) shows that increasing the number of states of the Viterbi processor to 256 produces better results. It can also be seen that, using the 256-state VA, the Cartesian Gaussian (CG) metric produces better results (indicated by the line 240) than those produced by the polar Gaussian (PG) metric (indicated by the line 242) and the Euclidean distance metric (indicated by the line 244) and also outperforms the backpropagation (BP) algorithm (indicated by the line 246).

This suggests that the effectiveness of the Cartesian Gaussian scheme described above for high cumulative dispersion links may require VA states to account for a longer nonlinear ISI. As an alternative, or additionally, an initial backpropagation block can be used to partially absorb the long nonlinear interaction due to high dispersion, either when using non-compensated G655 non-zero dispersion fibre or when using non-compensated G652 single mode fibre.

There are thus described a receiver that is able to mitigate the effects of non linear distortion in the fibre, and a method of signal detection in such a receiver.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example. References to a processor also encompass implementations including one or more optical devices and circuits, including photodetectors and associated analog to digital converters, and integrated circuits containing such devices.

The functionality of circuits or circuitry described herein can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions.

Embodiments can have programs in the form of computer readable code i.e. machine-readable instructions (software) which, when executed by a processor, perform any of the described methods. The programs may be stored on an electronic memory device, hard disk, optical disk or other machine-readable storage medium or non-transitory medium. The programs can be downloaded to the storage medium via a network connection.

The invention claimed is:

1. A method of detecting a signal in an optical receiver, the method comprising:
   converting a received optical signal to a digital electrical signal comprising a plurality of samples having in-phase and quadrature components;
   applying a predetermined phase rotation to said samples;
   converting the in-phase and quadrature components to amplitude and phase components;
   applying an inverse of the predetermined phase rotation to the phase components such that phase range adjusted sample values have phases within ranges suitable for detection: and
   performing a first detection process based on the amplitude and phase components of the phase range adjusted sample values.

2. The method as claimed in claim 1, wherein the predetermined phase rotation is determined in a training process.

3. The method as claimed in claim 1, further comprising retrieving values for the predetermined phase rotation from a look up table, based on a phase of the respective sample.

4. The method as claimed in claim 1, wherein the first detection process is a Maximum Sequence Likelihood Estimation process.

5. The method as claimed in claim 1, further comprising:
   performing a second detection process based on the in-phase and quadrature components of the digital electrical signal; and
   selecting a detector output from outputs of the first and second detection processes.

6. The method as claimed in claim 5, wherein the second detection process is a Maximum Sequence Likelihood Estimation process.

7. The method as claimed in claim 5, further comprising:
   selecting the detector output based on respective quality measurements of outputs of the first and second detection processes.

8. The method as claimed in claim 1, wherein the optical receiver is an optical fibre receiver.

9. A detector for detecting an optical signal, the detector comprising a processor that is operative to:
   convert a received optical signal to a digital electrical signal comprising a plurality of samples having in-phase and quadrature components;
   apply a predetermined phase rotation to said samples;
   convert the in-phase and quadrature components to amplitude and phase components;
   apply an inverse of the predetermined phase rotation to the phase components such that phase range adjusted sample values have phases within ranges suitable for detection: and
   perform a first detection process based on the amplitude and phase components of the phase range adjusted sample values.

10. The detector as claimed in claim 9, wherein the detector is included in an optical receiver, wherein the optical receiver comprises an optical front end.

11. The detector as claimed in claim 10, wherein the detector is connected to a linear equalizer for receiving signals from the optical front end.

12. The detector as claimed in claim 10, wherein the detector is connected to a backpropagation block.

13. The detector as claimed in claim 9, wherein the predetermined phase rotation is determined in a training process.

14. The detector as claimed in claim 9, wherein the processor is further operative to retrieve values for the predetermined phase rotation from a look up table, based on a phase of the respective sample.

15. The detector as claimed in claim 9, wherein the first detection process is a Maximum Sequence Likelihood Estimation process.

16. The detector as claimed in claim 9, wherein the processor is further operative to:
   perform a second detection process based on said in-phase and quadrature components of the digital electrical signal; and
   select a detector output from outputs of the first and second detection processes.

17. The detector as claimed in claim 16, wherein the second detection process is a Maximum Sequence Likelihood Estimation process.

18. The detector as claimed in claim 16, wherein the processor is further operative to:
   select the detector output based on respective quality measurements of outputs of the first and second detection processes.

19. The detector as claimed in claim 9, wherein the optical receiver is an optical fibre receiver.

20. A non-transitory computer readable storage medium having instructions stored therein, wherein the instructions, when executed by a processor of an optical device, causes the processor to perform operations comprising:
converting a received optical signal to a digital electrical signal comprising a plurality of samples having in-phase and quadrature components;
applying a predetermined phase rotation to said samples;
converting the in-phase and quadrature components to amplitude and phase components:
applying an inverse of the predetermined phase rotation to the phase components such that phase range adjusted sample values have phases within ranges suitable for detection; and
performing a first detection process based on the amplitude and phase components of the phase range adjusted sample values.

21. The non-transitory computer readable storage medium as claimed in claim 20, wherein the predetermined phase rotation is determined in a training process.

22. The non-transitory computer readable storage medium as claimed in claim 20, the instructions cause the processor to perform further operations comprising retrieving values for the predetermined phase rotation from a look up table, based on a phase of the respective sample.

23. The non-transitory computer readable storage medium as claimed in claim 20, wherein the first detection process is a Maximum Sequence Likelihood Estimation process.

24. The non-transitory computer readable storage medium as claimed in claim 20, the instructions cause the processor to perform further operations comprising:
performing a second detection process based on the in-phase and quadrature components of the digital electrical signal; and
selecting a detector output from outputs of the first and second detection processes.

25. The non-transitory computer readable storage medium as claimed in claim 24, wherein the second detection process is a Maximum Sequence Likelihood Estimation process.

26. The non-transitory computer readable storage medium as claimed in claim 24, the instructions cause the processor to perform further operations comprising:
selecting the detector output based on respective quality measurements of outputs of the first and second detection processes.

27. The non-transitory computer readable storage medium as claimed in claim 20, wherein the optical receiver is an optical fibre receiver.

* * * * *